US010575094B1

(12) United States Patent
Slack

(10) Patent No.: US 10,575,094 B1
(45) Date of Patent: Feb. 25, 2020

(54) COMBINATION OF IMMERSIVE AND BINAURAL SOUND

(71) Applicant: DTS, Inc., Calabasas, CA (US)

(72) Inventor: Brian Slack, Northridge, CA (US)

(73) Assignee: DTS, Inc., Calabasas, CA (US)

(*) Notice: Subject to any disclaimer, the term of this patent is extended or adjusted under 35 U.S.C. 154(b) by 0 days.

(21) Appl. No.: 16/219,180

(22) Filed: Dec. 13, 2018

(51) Int. Cl.

| | |
|---|---|
| ***H04B 3/00*** | (2006.01) |
| ***H04R 3/12*** | (2006.01) |
| ***H04R 5/04*** | (2006.01) |
| ***H04R 5/02*** | (2006.01) |
| ***H04R 5/033*** | (2006.01) |
| *H04S 1/00* | (2006.01) |

(52) U.S. Cl.
CPC ................. *H04R 3/12* (2013.01); *H04R 5/02* (2013.01); *H04R 5/033* (2013.01); *H04R 5/04* (2013.01); *H04S 1/005* (2013.01); *H04S 2400/11* (2013.01)

(58) Field of Classification Search
CPC ........................................................ H04B 3/00
See application file for complete search history.

(56) References Cited

U.S. PATENT DOCUMENTS

| | | | |
|---|---|---|---|
| 9,226,091 B2 | 12/2015 | Lyons et al. | |
| 9,532,158 B2 | 12/2016 | Lando et al. | |
| 9,794,718 B2 | 10/2017 | Crockett et al. | |
| 9,826,328 B2 | 11/2017 | Mehta et al. | |
| 10,143,921 B1 * | 12/2018 | Strahle | A63F 13/424 |
| 10,206,053 B1 * | 2/2019 | Welti | H04R 29/001 |
| 2014/0016786 A1 * | 1/2014 | Sen | G10L 19/008 381/23 |
| 2015/0208161 A1 * | 7/2015 | Lesaffre | H04N 21/4126 381/74 |
| 2015/0208190 A1 | 7/2015 | Hooks et al. | |
| 2015/0223002 A1 | 8/2015 | Mehta et al. | |
| 2015/0341738 A1 | 11/2015 | Lyons et al. | |
| 2015/0350804 A1 | 12/2015 | Crockett et al. | |
| 2017/0325043 A1 * | 11/2017 | Jot | H04S 7/302 |
| 2018/0020310 A1 | 1/2018 | Crockett et al. | |
| 2018/0077511 A1 | 3/2018 | Mehta | |
| 2018/0343534 A1 * | 11/2018 | Norris | H04N 7/147 |
| 2019/0037334 A1 * | 1/2019 | Acharya | H04R 3/04 |
| 2019/0069114 A1 * | 2/2019 | Tai | H04S 7/301 |
| 2019/0116444 A1 * | 4/2019 | Benattar | H04S 7/303 |

* cited by examiner

*Primary Examiner* — Olisa Anwah
(74) *Attorney, Agent, or Firm* — Schwegman Lundberg & Woessner, P.A.

(57) ABSTRACT

The present subject matter provides a technical solution to the technical problems facing sound localization by separating sounds and reproducing the separated sounds using a set of loudspeakers and a set of headphones. A general soundtrack that is meant to be experienced throughout the room would play through the loudspeakers, and specific sounds that are meant to be experienced near the listener would be played through a binaural representation in the headphones. The headphones may be selected to avoid occluding the ear, allowing sound produced at the loudspeakers to be heard clearly. This separation and reproduction of sounds using a combination of a loudspeaker and headphone provides a technical solution to the technical problem facing typical surround sound systems by localizing sounds for listeners in any location within a room. This improves reproduction accuracy of location-specific audio objects, including audio objects above or below a coplanar speaker configuration.

20 Claims, 5 Drawing Sheets

COMBINATION OF IMMERSIVE AND BINAURAL SOUND

TECHNICAL FIELD

The technology described in this patent document relates to systems and methods for reproducing surround sound encoded audio for a listener.

BACKGROUND

A surround sound system includes multiple speakers for reproducing an audio source for a listener (e.g., user). A typical surround sound system may include front, rear, or side speakers arranged to create the perception of sound coming from any direction in a horizontal plane around the listener. An immersive sound system may include speakers above or below a listener's ears, which may be used to create the perception of sound coming from any location around the listener.

Surround or immersive sound systems may be able to localize a sound to a particular point in a room, and typically localize sound at a "sweet spot" or primary listening position, which describes a listener's physical position that localizes the reproduced sound at the location of the listener's ears. However, such systems are unable place a sound in a position relative to listeners in various positions. For example, sound that is localized to the right of one listener may be localized to the left of another listener. This room-specific localization may reduce the number of positions where listeners can be seated. What is needed is an improved system for reproducing surround sound at various listener positions.

DESCRIPTION OF EMBODIMENTS

Figure 1:
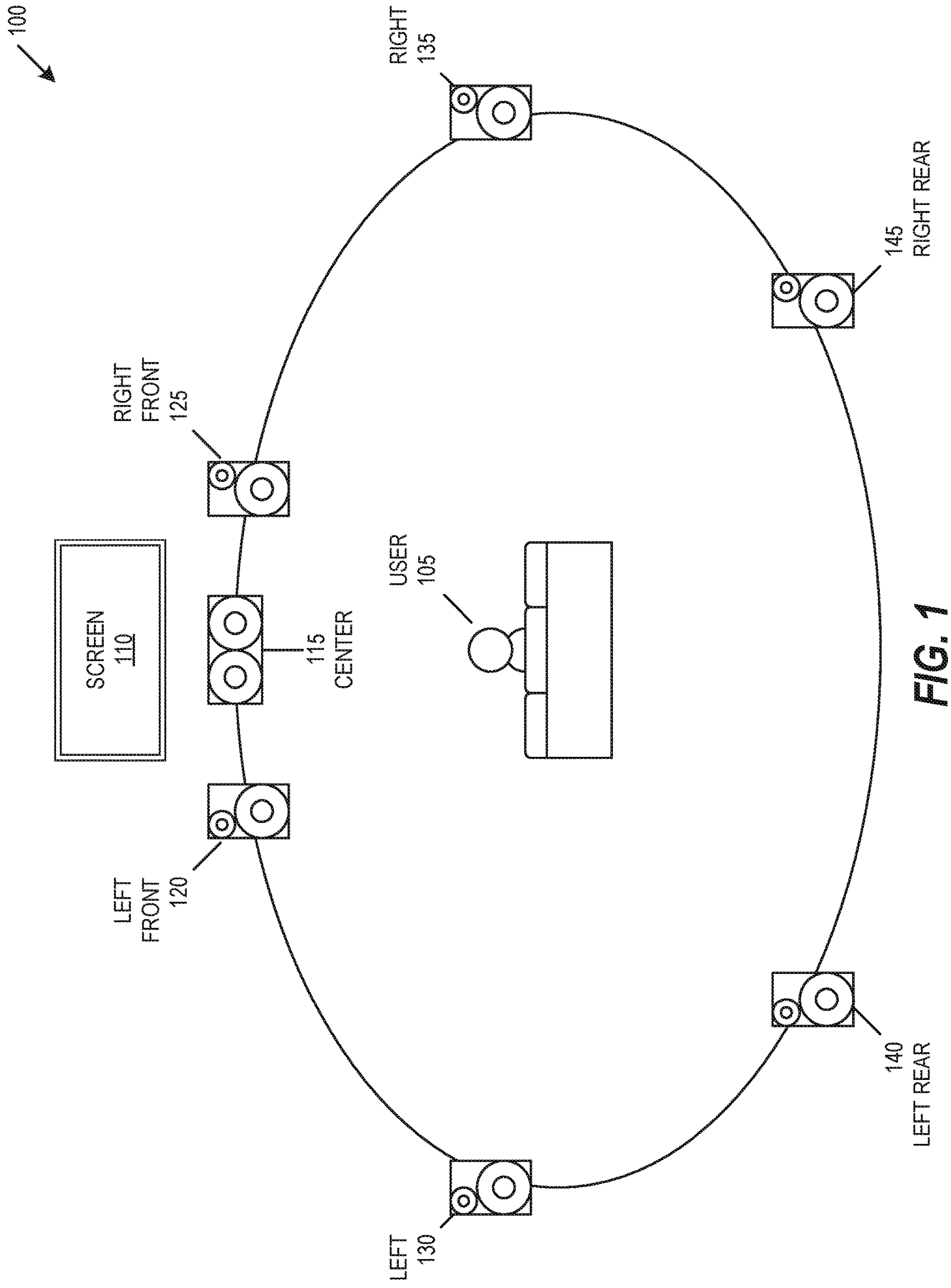
FIG. 1 is a diagram of an example surround system, according to an example embodiment.

The present subject matter provides a technical solution to the technical problems facing sound localization by separating sounds and reproducing the separated sounds using a set of loudspeakers and a set of headphones. In an example, a general soundtrack that is meant to be experienced throughout the room would play through the loudspeakers, and specific sounds that are meant to be experienced near the listener would be played through a binaural representation in the headphones. The headphones may be selected to avoid occluding the ear, allowing sound produced at the loudspeakers to be heard clearly. This separation and reproduction of sounds using a combination of a loudspeaker and headphone provides a technical solution to the technical problem facing typical surround sound systems by localizing sounds for listeners in any location within a room. This improves reproduction accuracy of location-specific audio objects, including audio objects above or below a coplanar speaker configuration. By providing improved reproduction accuracy without requiring additional speakers, this solution provides an accessional immersive audio experience.

As used in the following description of embodiments, an "audio object" includes 3-D positional data. Thus, an audio object should be understood to include a particular combined representation of an audio source with static or dynamic 3-D positional data. In contrast, a "sound source" is an audio signal for playback or reproduction in a final mix or render and it has an intended static or dynamic rendering method or purpose. A sound source may be associated with one or more specific channels (e.g., the signal "Front Left," the low frequency effects (LFE) channel), associated with a panning between two or more sound source origination directions (e.g., panned from a center channel to 90 degrees to the right), or associated with other directional configurations.

This description includes a method and apparatus for synthesizing audio signals, particularly in loudspeakers and headphone (e.g., headset) applications. While aspects of the disclosure are presented in the context of exemplary systems that include loudspeakers or headsets, it should be understood that the described methods and apparatus are not limited to such systems and that the teachings herein are applicable to other methods and apparatus that include synthesizing audio signals. The following description and the drawings sufficiently illustrate specific embodiments to enable those skilled in the art to understand each specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims. The description sets forth the functions and the sequence of steps for developing and operating the present subject matter in connection with the illustrated embodiment. It is to be understood that the same or equivalent functions and sequences may be accomplished by different embodiments that are also intended to be encompassed within the spirit and scope of the present subject matter. It is further understood that the use of relational terms (e.g., first, second) are used solely to distinguish one from another entity without necessarily requiring or implying any actual such relationship or order between such entities.

FIG. 1 is a diagram of an example surround system 100, according to an example embodiment. System 100 may provide surround sound for a user 105, such as a user viewing a video on a screen 110. The surround sound system 100 may include a center channel 115 centered between the screen 110 and the user 105. System 100 may include pairs of left and right speakers, including a left front speaker 120, a right front speaker 125, a left speaker 130, a right speaker 135, a left rear speaker 140, and a right rear speaker 145. The combination of speakers in the surround sound system 100 may be used to create the perception of sound coming from any direction around the listener.

Figure 2:
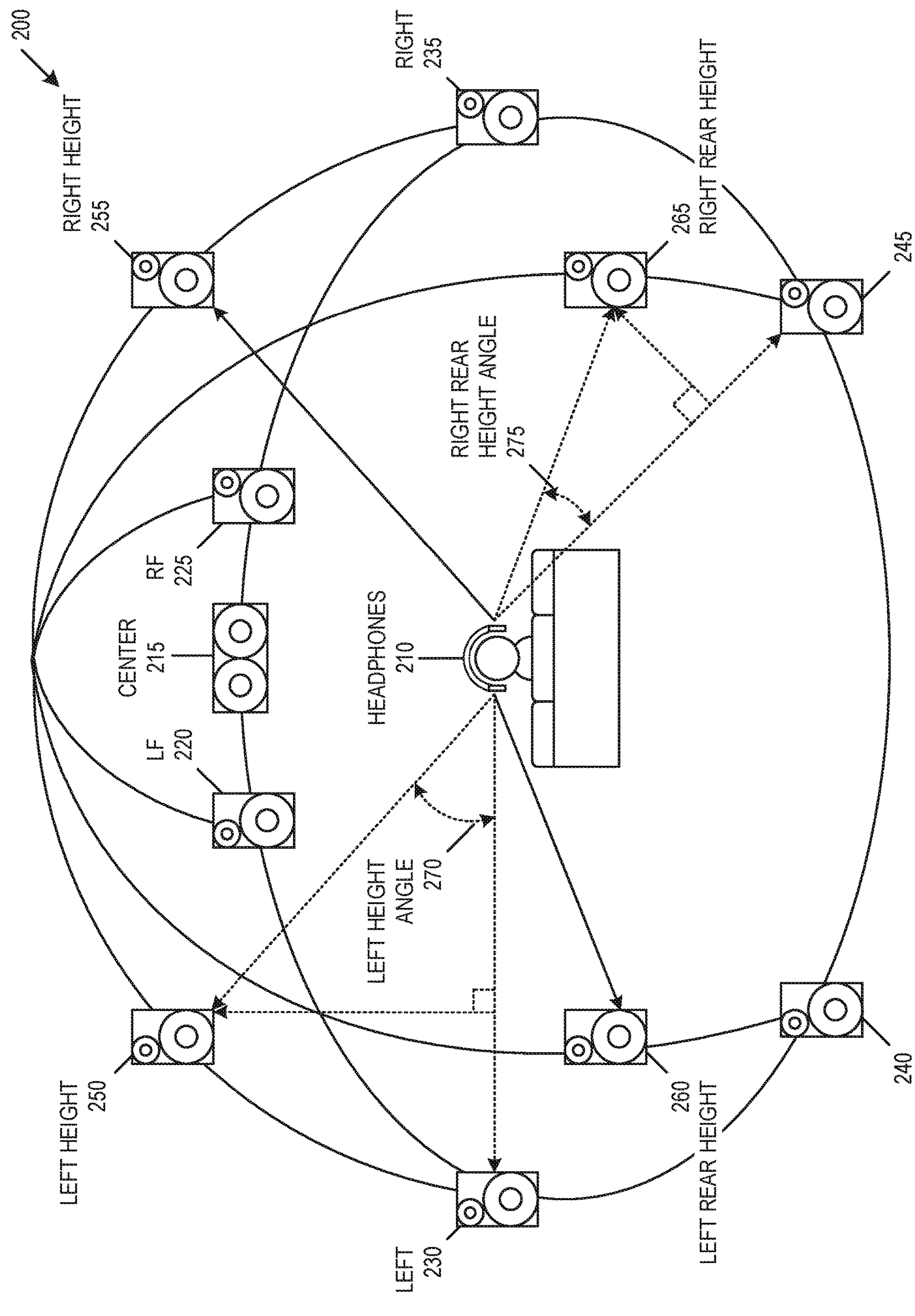
FIG. 2 is a diagram of a first immersive and binaural sound system, according to an example embodiment.

FIG. 2 is a diagram of a first immersive and binaural sound system 200, according to an example embodiment. The immersive and binaural sound system 200 may include one or more physical loudspeakers, such as a center channel 215, a left front speaker 220, and a right front speaker 225, a left speaker 230, a right speaker 235, a left rear speaker 240, and a right rear speaker 245.

In addition to physical loudspeakers, the immersive and binaural sound system 200 may include headphones 210. The headphones 210 may be used to create "virtual speakers," which create a perception of sound being reproduced at various loudspeakers or at any location between loudspeakers. For example, headphones 210 may create a perception of a sound directly behind the listener, a sound that may otherwise be created by left rear speaker 240 and right rear speaker 245. While physical rear speakers may be able to reproduce a sound from behind a listener positioned directly between two physical rear speakers, listeners to the left or right of the center of the room would perceive the same audio as originating from behind and to the right or left. In contrast, the headphones 210 may create a perception of a sound from directly behind the listener regardless of the listener's position in the room. The headphones 210 may be selected to reproduce sound while allowing the listener to receive sound from the loudspeakers. In an embodiment, headphones 210 may include bone conduction headphones that do not cover the ear, and instead transduce audio through a listener's facial bone structure. In another embodiment, headphone 210 may include an open-ear headphone design configured to reduce or eliminate occlusion of sound received from the loudspeakers.

Headphones 210 may also be used to create virtual speakers that create a perception of sound being reproduced at loudspeakers above or below the listener. In an embodiment, virtual speakers may include left height speaker 250, which may be positioned to the left of the listener and at an angle above horizontal, such as left height angle 270. Virtual speakers may also include a right height speaker 255, a left rear height speaker 260, and a right rear height channel 265. Additional virtual speakers (not shown) may be created by the headphones 210. In some embodiments, the number and placement of virtual speakers may conform to a predetermined speaker configuration, such as 5.1 channels, 7.1 channels, and other configurations. An additional advantage provided by the ability to create virtual speakers includes the ability to reduce a speaker count. For example, a theater could implement a 7.1 channel system with fewer than 7.1 loudspeakers, or a theater unable to mount one or more loudspeakers (e.g., a historical theater) may use headphones 210 to supplement or replace the loudspeakers.

To create the perception of sound being reproduced at various locations, the headphones 210 may include multiple speakers per ear or just one speaker per ear. Various digital signal processing (DSP) techniques may be used to create the perception of sound from locations other than directly from the speakers in the headphones. One such technique includes sampling a selection of head related transfer functions (HRTFs) at various locations around a head, where each HRTF describes changes to the source audio signal that correspond to each of the various locations around the head, changes that create the perception of the sound coming from each of those locations. The sound may be reproduced at any of the HRTF sampling locations, or the HRTFs may be interpolated to approximate an HRTF that for any location in between the measured HRTF locations. In an embodiment, all measured ipsilateral and contralateral HRTFs may be converted to minimum phase and linear interpolation performed between them to derive an HRTF pair, where each HRTF pair is then combined with an appropriate interaural time delay (ITD) to represent the HRTF for the desired synthetic location. These techniques may be used with headphones 210 to create virtual speakers or to create the perception of an audio object moving near the user, such as shown in FIG. 3.

Figure 3:
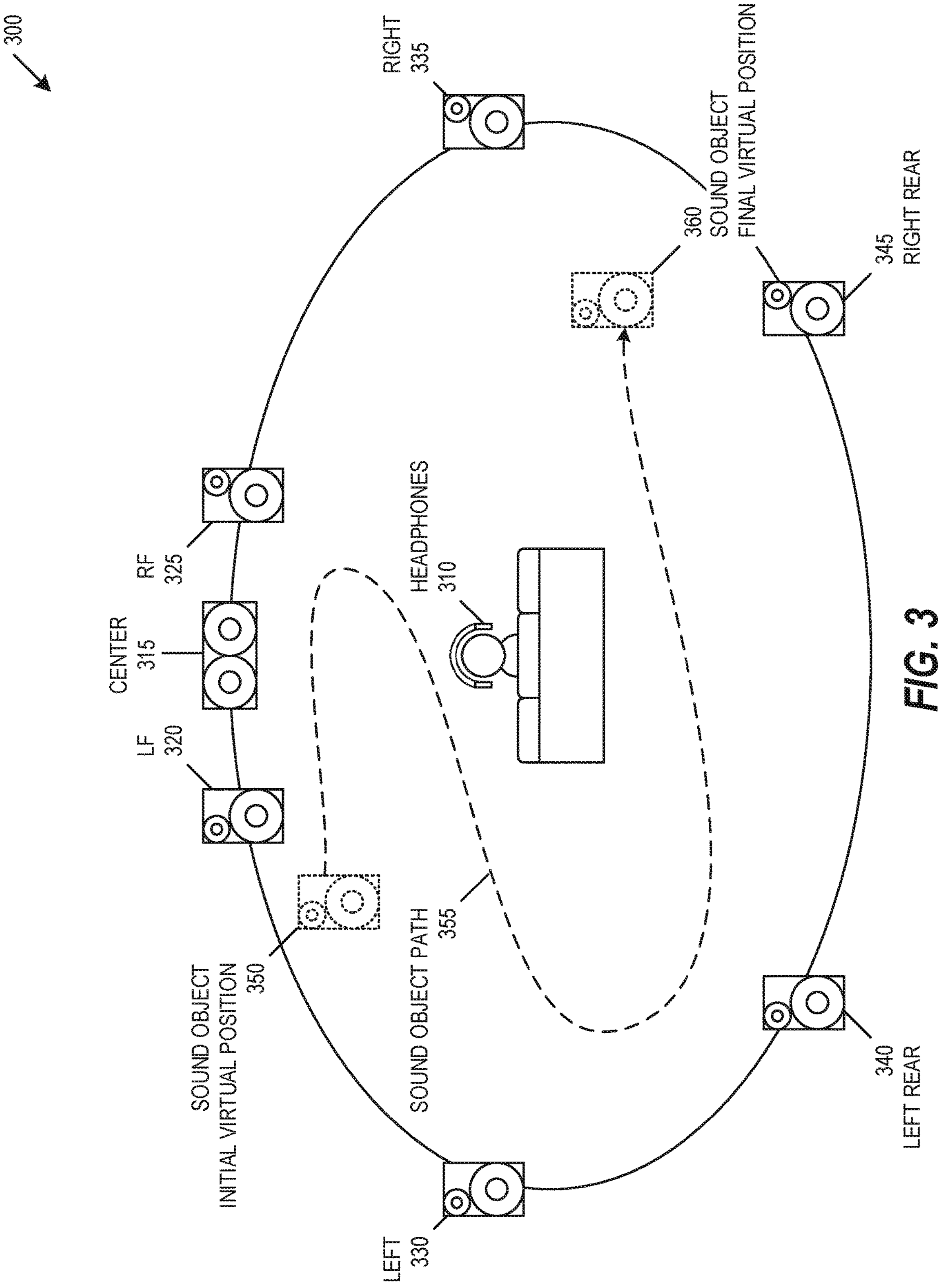
FIG. 3 is a diagram of a second immersive and binaural sound system, according to an example embodiment.

FIG. 3 is a diagram of a second immersive and binaural sound system 300, according to an example embodiment. The immersive and binaural sound system 300 may include headphones 310 and one or more physical loudspeakers 315-345. The headphones 310 may be used to create the perception that a sound is reproduced at an audio object initial virtual position 350, moved along an audio object path 355, and coming to rest at an audio object final virtual position 360. In various examples, this may be used to represent a person pacing around the listener, a bee buzzing around the listener, or any other moving audio object. By using the headphones 310 to reproduce the initial position 350, audio object path 355, and final position 360, the audio object location and motion are relative to the listener. This allows any listener using headphones 310 to experience the same audio object location and motion regardless of position within the listening or viewing area. While FIG. 3 depicts fewer virtual speakers than FIG. 2, both system 200 and system 300 may be capable of reproducing any number of virtual speakers or audio objects.

To provide accurate reproduction of sound for each listener, the immersive and binaural sound systems 200 and 300 may include one or more techniques for separating audio signals for reproduction by loudspeakers or headphones. In an embodiment, a source audio signal may be separated such that audio objects (and corresponding 3-D positional data) may be reproduced by headphones, whereas a sound source may be reproduced by loudspeakers. In another embodiment, a source audio signal may be separated such that egocentric audio (e.g., audio specific to each listener) may be reproduced by headphones, whereas allocentric audio (e.g., audio specific to a room or environment) may be reproduced by loudspeakers. In another embodiment, a source audio signal may be separated such that diegetic audio (e.g., sources that are typically visible on the screen or implied to be present, such as movie character voices or sound from objects within an object-based sound field) may be reproduced by headphones, whereas non-diegetic audio (e.g., sources that are typically not visible on the screen or implied to be not physically present in the scene, such as a film score or a narrator's commentary) may be reproduced by loudspeakers. Various combinations of these techniques may be used to separate a source audio signal, such as using a center channel to reproduce diegetic audio corresponding to objects visible on a screen (e.g., the speaking lines of an actor on the center of the screen), while using headphones to reproduce diegetic audio that is not visible on the screen (e.g., a voice from a crowd appearing to come from behind the listener).

The immersive and binaural sound systems 200 and 300 provide additional advantages over typical surround sound systems. A typical surround sound system maps a predetermined input audio signal configuration to a specific loudspeaker configuration (e.g., 5.1 surround maps to five loudspeakers in a specific geometry). However, there may be situations where the number of speakers or speaker geometry may not conform a predetermined input audio signal configuration. The immersive and binaural sound systems 200 and 300 may respond to these nonstandard configurations (e.g., rendering exceptions), and may separate and reproduce audio signals based on a number, position, frequency response, or other characteristic of loudspeakers or headphones. In an embodiment, the separation of audio signals for reproduction by loudspeakers or headphones may be based on the number or position of available loudspeakers. An immersive and binaural sound system may receive an indication of a number and position of available loudspeakers, and may separate input audio signals into channels for each available loudspeaker and headphone speaker. For example, when a source audio signal is associated with a predetermined configuration (e.g., 5.1 surround sound) but there are fewer loudspeakers than required for the predetermined configuration, the audio signals may be separated such that the headphones provide virtual speakers corresponding to the predetermined configuration. In another embodiment, the separation of audio signals may be responsive to a change in the number or position of available loudspeakers. For example, when a headphone connection is detected, the audio signals may be separated into allocentric loudspeaker audio signals and egocentric headphone audio signals. Similarly, when a headphone disconnection is detected, audio signals may be recombined such that all audio is reproduced by the available loudspeakers. In another embodiment, the separation of audio signals may be responsive to a frequency response of available loudspeakers or headphones. For example, detection of bone conduction headphones may indicate a reduced frequency response, and audio signals may be recombined such that loudspeakers compensate for the reduced frequency response. The various characteristics of loudspeakers or headphones may be provided by a user measurement (e.g., speaker geometry measured by a theater audio engineer), may be provided by one or more sensors in the speakers, or may be provided by data sent by the loudspeakers or headphones. The various characteristics of loudspeakers or headphones may be detected by the immersive and binaural sound system, such as through a self-test or automatic configuration routine. By being responsive to rendering exceptions, including the number, position, or changes to the available loudspeakers or headphones, the immersive and binaural sound systems 200 and 300 provides improved flexibility during initial installation and provides improved adaptability to any subsequent configuration changes.

Figure 4:
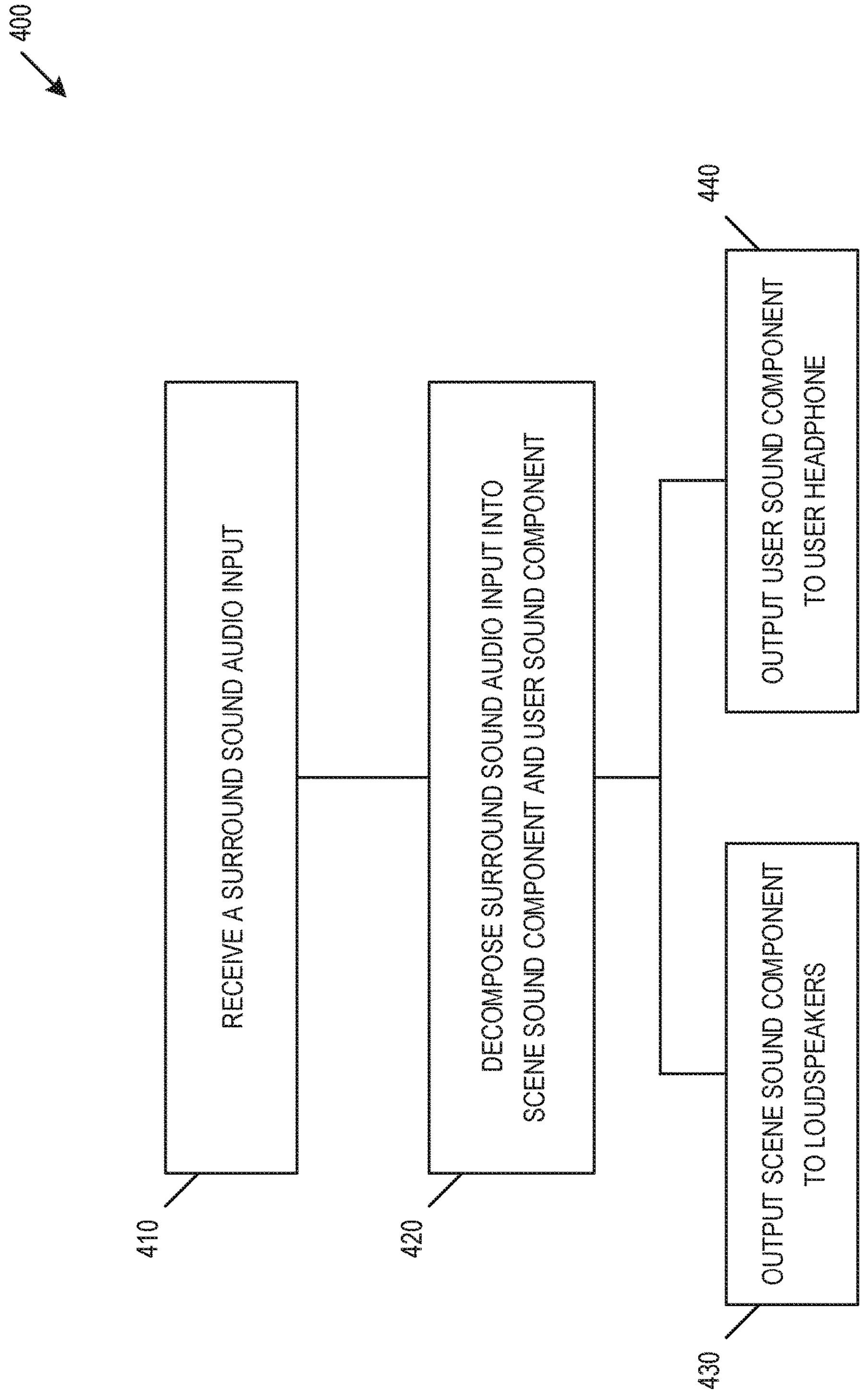
FIG. 4 is a flow diagram of an immersive and binaural sound method, according to an example embodiment.

FIG. 4 is a flow diagram of an immersive and binaural sound method 400, according to an example embodiment. Method 400 may include receiving 410 a surround sound audio input and decomposing 420 the surround sound audio input into a scene sound component and a user sound component. In an embodiment, the decomposition of the surround sound audio input is responsive to a detection of a headphone connection. In another embodiment, the decomposition of the surround sound audio input is responsive to an analysis of the input audio channels. For example, the surround sound audio input may have an associated number of loudspeaker audio channels and loudspeaker locations, and based on a difference between the surround sound audio input and the physical loudspeakers, one or more of the surround sound audio input channels may be reallocated to the user headphones.

The decomposition 420 of the surround sound audio input may be based on one or more characteristics of the surround sound audio input. In an embodiment, the decomposition of the surround sound audio input may include decomposing audio objects to the scene sound component, each audio object including an associated audio object position, and include decomposing a sound source to the user sound component, the sound source including a playback audio signal in a final mix with an associated rendering method. In another embodiment, the decomposition of the surround sound audio input may include decomposing egocentric audio to the scene sound component, the egocentric audio including audio specific to each headphone user, and include decomposing allocentric audio to the user sound component, the allocentric audio including audio specific to a room. In another embodiment, the decomposition of the surround sound audio input may include decomposing diegetic audio to the scene sound component, the diegetic audio including audio visible on a video screen or implied to be present on a scene displayed on the video screen, and include decomposing non-diegetic audio to the user sound component, the non-diegetic audio not visible on the video screen or not implied to be present on the scene displayed on the video screen. In various embodiments, user sound component includes a moving sound object or an elevated sound object, the elevated sound object having an associated 3-D position above a listener location.

Method 400 may include outputting 430 the scene sound component to a plurality of loudspeakers and outputting 440 the user sound component to a user headphone. If a headphone disconnection is subsequently detected, the scene sound component and the user sound component may both be output to the plurality of loudspeakers. The user headphone may include a bone conduction headphone. The user headphone may include stereo headphones, and wherein a head related transfer function (HRTF) is used to create a perception of sound from a location around the user headphone.

Figure 5:
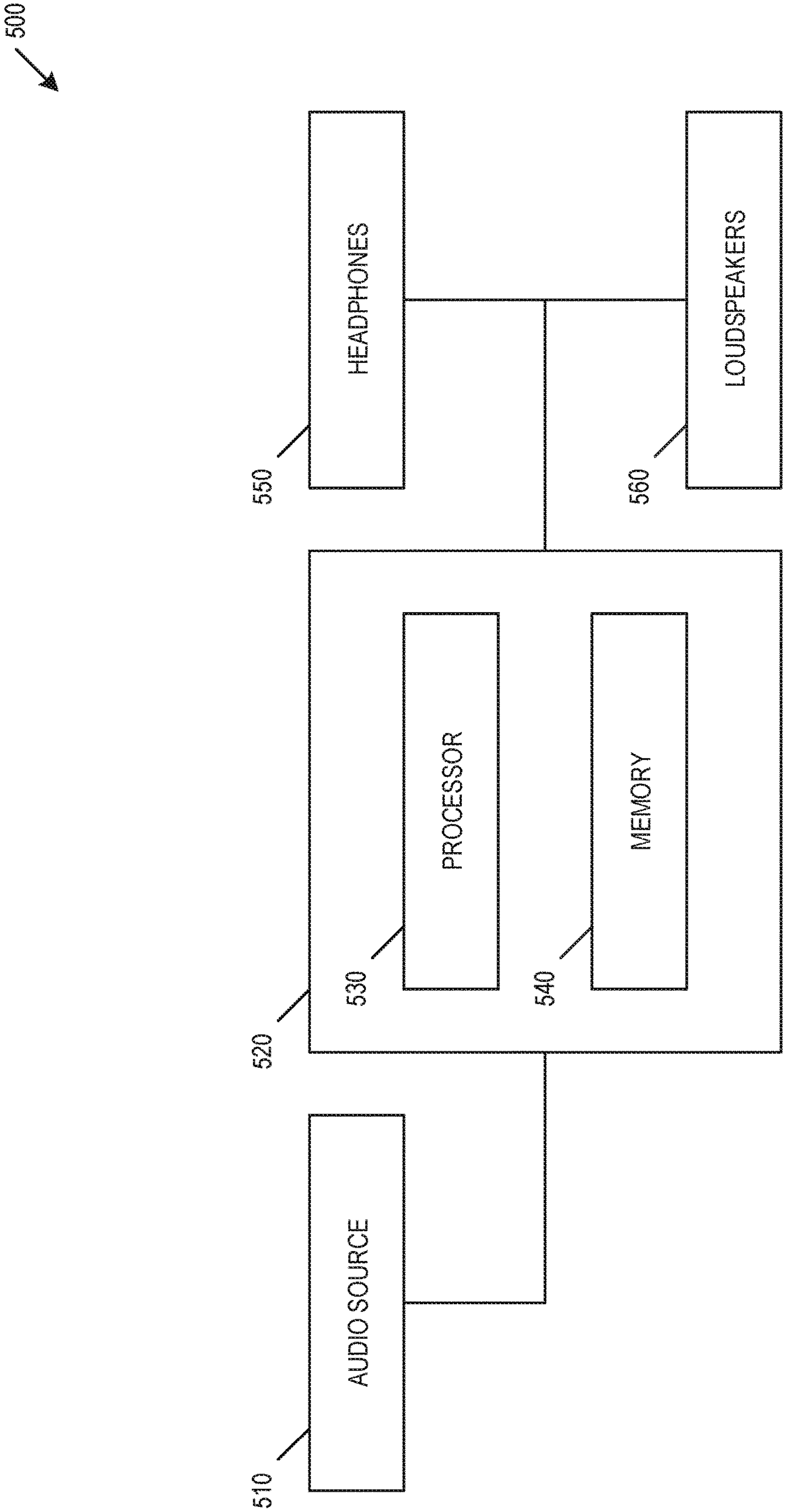
FIG. 5 is a block diagram of an immersive and binaural sound system, according to an example embodiment.

FIG. 5 is a block diagram of an immersive and binaural sound system 500, according to an example embodiment. System 500 can include an audio source 510 that provides an input audio signal. System 500 can include one or more headphones 550 or loudspeakers 560 to reproduce audio based on the techniques described above. System 500 can include processing circuit 520 operatively coupled to audio source 510.

Processing circuit 520 can include one or more processors 530 and memory 540 having instructions to do conduct functions of processing circuit 520 as taught herein. For example, processing circuit 520 can be configured to receive a surround sound audio input, decompose the surround sound audio input into a scene sound component and a user sound component, output the scene sound component to a plurality of loudspeakers, and output the user sound component to a user headphone. The one or more processors 530 can include a baseband processor. Processing circuit 520 can include hardware and software to perform functionalities as taught herein, for example, but not limited to, functionalities and structures associated with FIGS. 1-4.

The audio source may include multiple audio signals (i.e., signals representing physical sound). These audio signals are represented by digital electronic signals. These audio signals may be analog, however typical embodiments of the present subject matter would operate in the context of a time series of digital bytes or words, where these bytes or words form a discrete approximation of an analog signal or ultimately a physical sound. The discrete, digital signal corresponds to a digital representation of a periodically sampled audio waveform. For uniform sampling, the waveform is to be sampled at or above a rate sufficient to satisfy the Nyquist sampling theorem for the frequencies of interest. In a typical embodiment, a uniform sampling rate of approximately 44,100 samples per second (e.g., 44.1 kHz) may be used, however higher sampling rates (e.g., 96 kHz, 128 kHz) may alternatively be used. The quantization scheme and bit resolution should be chosen to satisfy the requirements of a particular application, according to standard digital signal processing techniques. The techniques and apparatus of the present subject matter typically would be applied interdependently in a number of channels. For example, it could be used in the context of a "surround" audio system (e.g., having more than two channels).

As used herein, a "digital audio signal" or "audio signal" does not describe a mere mathematical abstraction, but instead denotes information embodied in or carried by a physical medium capable of detection by a machine or apparatus. These terms include recorded or transmitted signals, and should be understood to include conveyance by any form of encoding, including pulse code modulation (PCM) or other encoding. Outputs, inputs, or intermediate audio signals could be encoded or compressed by any of various known methods, including MPEG, ATRAC, AC3, or the proprietary methods of DTS, Inc. as described in U.S. Pat. Nos. 5,974,380; 5,978,762; and 6,487,535. Some modification of the calculations may be required to accommodate a particular compression or encoding method, as will be apparent to those with skill in the art.

In software, an audio "codec" includes a computer program that formats digital audio data according to a given audio file format or streaming audio format. Most codecs are implemented as libraries that interface to one or more multimedia players, such as QuickTime Player, XMMS, Winamp, Windows Media Player, Pro Logic, or other codecs. In hardware, audio codec refers to one or more devices that encode analog audio as digital signals and decode digital back into analog. In other words, it contains both an analog-to-digital converter (ADC) and a digital-to-analog converter (DAC) running off a common clock.

An audio codec may be implemented in a consumer electronics device, such as a DVD player, Blu-Ray player, TV tuner, CD player, handheld player, Internet audio/video device, gaming console, mobile phone, or another electronic device. A consumer electronic device includes a Central Processing Unit (CPU), which may represent one or more conventional types of such processors, such as an IBM PowerPC, Intel Pentium (x86) processors, or other processor. A Random Access Memory (RAM) temporarily stores results of the data processing operations performed by the CPU, and is interconnected thereto typically via a dedicated memory channel. The consumer electronic device may also include permanent storage devices such as a hard drive, which are also in communication with the CPU over an input/output (I/O) bus. Other types of storage devices such as tape drives, optical disk drives, or other storage devices may also be connected. A graphics card may also be connected to the CPU via a video bus, where the graphics card transmits signals representative of display data to the display monitor. External peripheral data input devices, such as a keyboard or a mouse, may be connected to the audio reproduction system over a USB port. A USB controller translates data and instructions to and from the CPU for external peripherals connected to the USB port. Additional devices such as printers, microphones, speakers, or other devices may be connected to the consumer electronic device.

The consumer electronic device may use an operating system having a graphical user interface (GUI), such as WINDOWS from Microsoft Corporation of Redmond, Wash., MAC OS from Apple, Inc. of Cupertino, Calif., various versions of mobile GUIs designed for mobile operating systems such as Android, or other operating systems. The consumer electronic device may execute one or more computer programs. Generally, the operating system and computer programs are tangibly embodied in a computer-readable medium, where the computer-readable medium includes one or more of the fixed or removable data storage devices including the hard drive. Both the operating system and the computer programs may be loaded from the aforementioned data storage devices into the RAM for execution by the CPU. The computer programs may comprise instructions, which when read and executed by the CPU, cause the CPU to perform the steps to execute the steps or features of the present subject matter.

The audio codec may include various configurations or architectures. Any such configuration or architecture may be readily substituted without departing from the scope of the present subject matter. A person having ordinary skill in the art will recognize the above-described sequences are the most commonly used in computer-readable mediums, but there are other existing sequences that may be substituted without departing from the scope of the present subject matter.

Elements of one embodiment of the audio codec may be implemented by hardware, firmware, software, or any combination thereof. When implemented as hardware, the audio codec may be employed on a single audio signal processor or distributed amongst various processing components. When implemented in software, elements of an embodiment of the present subject matter may include code segments to perform the necessary tasks. The software preferably includes the actual code to carry out the operations described in one embodiment of the present subject matter, or includes code that emulates or simulates the operations. The program or code segments can be stored in a processor or machine accessible medium or transmitted by a computer data signal embodied in a carrier wave (e.g., a signal modulated by a carrier) over a transmission medium. The "processor readable or accessible medium" or "machine readable or accessible medium" may include any medium that can store, transmit, or transfer information.

Examples of the processor readable medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, or other media. The computer data signal may include any signal that can propagate over a transmission medium such as electronic network channels, optical fibers, air, electromagnetic, RF links, or other transmission media. The code segments may be downloaded via computer networks such as the Internet, Intranet, or another network. The machine accessible medium may be embodied in an article of manufacture. The machine accessible medium may include data that, when accessed by a machine, cause the machine to perform the operation described in the following. The term "data" here refers to any type of information that is encoded for machine-readable purposes, which may include program, code, data, file, or other information.

Embodiments of the present subject matter may be implemented by software. The software may include several modules coupled to one another. A software module is coupled to another module to generate, transmit, receive, or process variables, parameters, arguments, pointers, results, updated variables, pointers, or other inputs or outputs. A software module may also be a software driver or interface to interact with the operating system being executed on the platform. A software module may also be a hardware driver to configure, set up, initialize, send, or receive data to or from a hardware device.

Embodiments of the present subject matter may be described as a process that is usually depicted as a flowchart, a flow diagram, a structure diagram, or a block diagram. Although a block diagram may describe the operations as a sequential process, many of the operations can be performed in parallel or concurrently. In addition, the order of the operations may be rearranged. A process may be terminated when its operations are completed. A process may correspond to a method, a program, a procedure, or other group of steps.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description. This disclosure has been described in detail and with reference to exemplary embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents. Each patent and publication referenced or mentioned herein is hereby incorporated by reference to the same extent as if it had been incorporated by reference in its entirety individually or set forth herein in its entirety. Any conflicts of these patents or publications with the teachings herein are controlled by the teaching herein.

To better illustrate the method and apparatuses disclosed herein, a non-limiting list of embodiments is provided here.

Example 1 is an immersive sound system comprising: one or more processors; a storage device comprising instructions, which when executed by the one or more processors, configure the one or more processors to: receive a surround sound audio input; decompose the surround sound audio input into a scene sound component and a user sound component; output the scene sound component to a plurality of loudspeakers; and output the user sound component to a user headphone.

In Example 2, the subject matter of Example 1 optionally includes the instructions further configuring the one or more processors to detect a headphone connection, wherein the decomposition of the surround sound audio input is responsive to the detection of the headphone connection.

In Example 3, the subject matter of any one or more of Examples 1-2 optionally include the instructions further configuring the one or more processors to: detect a headphone disconnection; and output, responsive to the detection of the headphone disconnection, the scene sound component and the user sound component to the plurality of loudspeakers.

In Example 4, the subject matter of any one or more of Examples 1-3 optionally include the instructions further configuring the one or more processors to: determine a plurality of audio channels associated with surround sound audio input, each of the plurality of audio channels having an associated loudspeaker location; receive loudspeaker configuration information, the loudspeaker configuration information indicating the number and location of each of the plurality of loudspeakers; identify one or more unmatched channels based on a comparison between the plurality of audio channels and the loudspeaker configuration information; and output the one or more unmatched channels to the user headphone.

In Example 5, the subject matter of any one or more of Examples 1-4 optionally include wherein the user sound component includes a moving sound object.

In Example 6, the subject matter of any one or more of Examples 1-5 optionally include wherein the user sound component includes an elevated sound object, the elevated sound object having an associated position above a listener location.

In Example 7, the subject matter of any one or more of Examples 1-6 optionally include wherein the user headphone includes a bone conduction headphone.

In Example 8, the subject matter of any one or more of Examples 1-7 optionally include wherein the user headphone includes stereo headphones, and wherein a head related transfer function (HRTF) is used to create a perception of sound from a location around the user headphone.

In Example 9, the subject matter of any one or more of Examples 1-8 optionally include wherein the decomposition of the surround sound audio input includes instructions further configuring the one or more processors to: decompose audio objects to the scene sound component, each audio object including an associated audio object position; and decompose a sound source to the user sound component, the sound source including a playback audio signal in a final mix with an associated rendering method.

In Example 10, the subject matter of any one or more of Examples 1-9 optionally include wherein the decomposition of the surround sound audio input includes instructions further configuring the one or more processors to: decompose egocentric audio to the scene sound component, the egocentric audio including audio specific to each headphone user; and decompose allocentric audio to the user sound component, the allocentric audio including audio specific to a room.

In Example 11, the subject matter of any one or more of Examples 1-10 optionally include wherein the decomposition of the surround sound audio input includes instructions further configuring the one or more processors to: decompose diegetic audio to the scene sound component, the diegetic audio including audio visible on a video screen or implied to be present on a scene displayed on the video screen; and decompose non-diegetic audio to the user sound component, the non-diegetic audio not visible on the video screen or not implied to be present on the scene displayed on the video screen.

Example 12 is an immersive sound system method comprising: receiving a surround sound audio input; decomposing the surround sound audio input into a scene sound component and a user sound component; outputting the scene sound component to a plurality of loudspeakers; and outputting the user sound component to a user headphone.

In Example 13, the subject matter of Example 12 optionally includes detecting a headphone connection, wherein the decomposition of the surround sound audio input is responsive to the detection of the headphone connection.

In Example 14, the subject matter of any one or more of Examples 12-13 optionally include detecting a headphone disconnection; and outputting, responsive to the detection of the headphone disconnection, the scene sound component and the user sound component to the plurality of loudspeakers.

In Example 15, the subject matter of any one or more of Examples 12-14 optionally include determining a plurality of audio channels associated with surround sound audio input, each of the plurality of audio channels having an associated loudspeaker location; receiving loudspeaker configuration information, the loudspeaker configuration information indicating the number and location of each of the plurality of loudspeakers; identifying one or more unmatched channels based on a comparison between the plurality of audio channels and the loudspeaker configuration information; and outputting the one or more unmatched channels to the user headphone.

In Example 16, the subject matter of any one or more of Examples 12-15 optionally include wherein the user sound component includes a moving sound object.

In Example 17, the subject matter of any one or more of Examples 12-16 optionally include wherein the user sound component includes an elevated sound object, the elevated sound object having an associated position above a listener location.

In Example 18, the subject matter of any one or more of Examples 12-17 optionally include wherein the user headphone includes a bone conduction headphone.

In Example 19, the subject matter of any one or more of Examples 12-18 optionally include wherein the user headphone includes stereo headphones, and wherein a head related transfer function (HRTF) is used to create a perception of sound from a location around the user headphone.

In Example 20, the subject matter of any one or more of Examples 12-19 optionally include wherein the decomposition of the surround sound audio input includes: decomposing audio objects to the scene sound component, each audio object including an associated audio object position; and decomposing a sound source to the user sound component, the sound source including a playback audio signal in a final mix with an associated rendering method.

In Example 21, the subject matter of any one or more of Examples 12-20 optionally include wherein the decomposition of the surround sound audio input includes: decomposing egocentric audio to the scene sound component, the egocentric audio including audio specific to each headphone user; and decomposing allocentric audio to the user sound component, the allocentric audio including audio specific to a room.

In Example 22, the subject matter of any one or more of Examples 12-21 optionally include wherein the decomposition of the surround sound audio input includes: decomposing diegetic audio to the scene sound component, the diegetic audio including audio visible on a video screen or implied to be present on a scene displayed on the video screen; and decomposing non-diegetic audio to the user sound component, the non-diegetic audio not visible on the video screen or not implied to be present on the scene displayed on the video screen.

Example 23 is one or more machine-readable medium including instructions, which when executed by a computing system, cause the computing system to perform any of the methods of Examples 12-22.

Example 24 is an apparatus comprising means for performing any of the methods of Examples 12-22.

Example 25 is a machine-readable storage medium comprising a plurality of instructions that, when executed with a processor of a device, cause the device to: receive a surround sound audio input; decompose the surround sound audio input into a scene sound component and a user sound component; output the scene sound component to a plurality of loudspeakers; and output the user sound component to a user headphone.

In Example 26, the subject matter of Example 25 optionally includes the instructions further causing the device to detect a headphone connection, wherein the decomposition of the surround sound audio input is responsive to the detection of the headphone connection.

In Example 27, the subject matter of any one or more of Examples 25-26 optionally include the instructions further causing the device to: detect a headphone disconnection; and output, responsive to the detection of the headphone disconnection, the scene sound component and the user sound component to the plurality of loudspeakers.

In Example 28, the subject matter of any one or more of Examples 25-27 optionally include the instructions further causing the device to: determine a plurality of audio channels associated with surround sound audio input, each of the plurality of audio channels having an associated loudspeaker location; receive loudspeaker configuration information, the loudspeaker configuration information indicating the number and location of each of the plurality of loudspeakers; identify one or more unmatched channels based on a comparison between the plurality of audio channels and the loudspeaker configuration information; and output the one or more unmatched channels to the user headphone.

In Example 29, the subject matter of any one or more of Examples 25-28 optionally include wherein the user sound component includes a moving sound object.

In Example 30, the subject matter of any one or more of Examples 25-29 optionally include wherein the user sound component includes an elevated sound object, the elevated sound object having an associated position above a listener location.

In Example 31, the subject matter of any one or more of Examples 25-30 optionally include wherein the user headphone includes a bone conduction headphone.

In Example 32, the subject matter of any one or more of Examples 25-31 optionally include wherein the user headphone includes stereo headphones, and wherein a head related transfer function (HRTF) is used to create a perception of sound from a location around the user headphone.

In Example 33, the subject matter of any one or more of Examples 25-32 optionally include wherein the decomposition of the surround sound audio input includes instructions further causing the device to: decompose audio objects to the scene sound component, each audio object including an associated audio object position; and decompose a sound source to the user sound component, the sound source including a playback audio signal in a final mix with an associated rendering method.

In Example 34, the subject matter of any one or more of Examples 25-33 optionally include wherein the decomposition of the surround sound audio input includes instructions further causing the device to: decompose egocentric audio to the scene sound component, the egocentric audio including audio specific to each headphone user; and decompose allocentric audio to the user sound component, the allocentric audio including audio specific to a room.

In Example 35, the subject matter of any one or more of Examples 25-34 optionally include wherein the decomposition of the surround sound audio input includes instructions further causing the device to: decompose diegetic audio to the scene sound component, the diegetic audio including audio visible on a video screen or implied to be present on a scene displayed on the video screen; and decompose non-diegetic audio to the user sound component, the non-diegetic audio not visible on the video screen or not implied to be present on the scene displayed on the video screen.

Example 36 is an immersive sound system apparatus comprising: receiving a surround sound audio input; decomposing the surround sound audio input into a scene sound component and a user sound component; outputting the scene sound component to a plurality of loudspeakers; and outputting the user sound component to a user headphone.

Example 37 is one or more machine-readable medium including instructions, which when executed by a machine, cause the machine to perform operations of any of the operations of Examples 1-36.

Example 38 is an apparatus comprising means for performing any of the operations of Examples 1-36.

Example 39 is a system to perform the operations of any of the Examples 1-36.

Example 40 is a method to perform the operations of any of the Examples 1-36.

The above detailed description includes references to the accompanying drawings, which form a part of the detailed description. The drawings show specific embodiments by way of illustration. These embodiments are also referred to herein as "examples." Such examples can include elements in addition to those shown or described. Moreover, the subject matter may include any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. An immersive sound system comprising:

one or more processors;

a storage device comprising instructions, which when executed by the one or more processors, configure the one or more processors to:

receive a surround sound audio input;

decompose the surround sound audio input into a scene sound component specific to a room and a user sound component specific to each headphone user;

output the scene sound component to a plurality of loudspeakers; and output the user sound component to a user headphone.

2. The system of claim 1, the instructions further configuring the one or more processors to detect a headphone connection, wherein the decomposition of the surround sound audio input is responsive to the detection of the headphone connection.

3. The system of claim 1, the instructions further configuring the one or more processors to:

detect a headphone disconnection; and output, responsive to the detection of the headphone disconnection, the scene sound component and the user sound component to the plurality of loudspeakers.

4. The system of claim 1, the instructions further configuring the one or more processors to:

determine a plurality of audio channels associated with surround sound audio input, each of the plurality of audio channels having an associated loudspeaker location;

receive loudspeaker configuration information, the loudspeaker configuration information indicating the number and location of each of the plurality of loudspeakers;

identify one or more unmatched channels based on a comparison between the plurality of audio channels and the loudspeaker configuration information; and output the one or more unmatched channels to the user headphone.

5. The system of claim 1, wherein the user sound component includes a moving sound object.

6. The system of claim 1, wherein the user sound component includes an elevated sound object, the elevated sound object having an associated 3-D position above a listener location.

7. The system of claim 1, wherein the user headphone includes a bone conduction headphone.

8. The system of claim 1, wherein the user headphone includes stereo headphones, and wherein a head related transfer function (HRTF) is used to create a perception of sound from a 3-D location around the user headphone.

9. The system of claim 1, wherein the decomposition of the surround sound audio input includes instructions further configuring the one or more processors to:

decompose audio objects to the scene sound component, each audio object including an associated 3-D audio object position; and decompose a sound source to the user sound component, the sound source including a playback audio signal in a final mix with an associated rendering method.

10. The system of claim 1, wherein the decomposition of the surround sound audio input includes instructions further configuring the one or more processors to:

decompose egocentric audio to the scene sound component, the egocentric audio including audio specific to each headphone user; and decompose allocentric audio to the user sound component, the allocentric audio including audio specific to a room.

11. The system of claim 1, wherein the decomposition of the surround sound audio input includes instructions further configuring the one or more processors to:

decompose diegetic audio to the scene sound component, the diegetic audio including audio visible on a video screen or implied to be present on a scene displayed on the video screen; and decompose non-diegetic audio to the user sound component, the non-diegetic audio not visible on the video screen or not implied to be present on the scene displayed on the video screen.

12. An immersive sound system method comprising:

receiving a surround sound audio input;

decomposing the surround sound audio input into a scene sound component specific to a room and a user sound component specific to each headphone user;

outputting the scene sound component to a plurality of loudspeakers; and outputting the user sound component to a user headphone.

13. The method of claim 12, further including detecting a headphone connection, wherein the decomposition of the surround sound audio input is responsive to the detection of the headphone connection.

14. The method of claim 12, further including:

detecting a headphone disconnection; and outputting, responsive to the detection of the headphone disconnection, the scene sound component and the user sound component to the plurality of loudspeakers.

15. The method of claim 12, further including:

determining a plurality of audio channels associated with surround sound audio input, each of the plurality of audio channels having an associated loudspeaker location;

receiving loudspeaker configuration information, the loudspeaker configuration information indicating the number and location of each of the plurality of loudspeakers;

identifying one or more unmatched channels based on a comparison between the plurality of audio channels and the loudspeaker configuration information; and outputting the one or more unmatched channels to the user headphone.

16. The method of claim 12, wherein the user headphone includes a bone conduction headphone.

17. The method of claim 12, wherein the user headphone includes stereo headphones, and wherein a head related transfer function (HRTF) is used to create a perception of sound from a 3-D location around the user headphone.

18. A non-transitory machine-readable storage medium comprising a plurality of instructions that, when executed with a processor of a device, cause the device to:

receive a surround sound audio input;

decompose the surround sound audio input into a scene sound component specific to a room and a user sound component specific to each headphone user;

output the scene sound component to a plurality of loudspeakers; and output the user sound component to a user headphone.

19. The non-transitory machine-readable storage medium of claim 18, the instructions further causing the device to detect a headphone connection, wherein the decomposition of the surround sound audio input is responsive to the detection of the headphone connection.

20. The non-transitory machine-readable storage medium of claim 18, the instructions further causing the device to:

detect a headphone disconnection; and output, responsive to the detection of the headphone disconnection, the scene sound component and the user sound component to the plurality of loudspeakers.

* * * * *